May 14, 1935.   G. EISGRUBER   2,001,675
CLOSED REMOVABLE NEEDLE BEARING
Filed Aug. 27, 1932

Patented May 14, 1935

2,001,675

UNITED STATES PATENT OFFICE 2,001,675

CLOSED REMOVABLE NEEDLE BEARING

Georg Eisgruber, Nuremberg, Germany

Application August 27, 1932, Serial No. 630,683
In Germany May 15, 1931

4 Claims. (Cl. 308—236)

This invention relates to a closed removable needle bearing especially for use as transmission bearing and as bearing for cylinders and pairs of cylinders on rolling mills by the construction of which it is possible to employ the needle bearings which are very sensitive to bending.

The needle bearing according to the invention is characterized in that from a rigid supporting hub known split cones extend step-like on one or both sides, annular grooves being provided at the point of junction so that no bending moments can be transmitted to the bearing part of the supporting hub when tightening the clamping nuts. This supporting part is therefore absolutely free from bending stresses and distortion so that the long needles, which are very sensitive to bending, can be employed which, as is known, can only be used where binding and therefore distortions of the bearing cannot occur.

As compared with the known ball or roller bearings, the advantage is derived by this type of bearing, that it can also be used when it is strongly stressed as regards shocks. Further, the bearing is of very small dimensions and can be substituted for any ring lubricating bearing. Consequently, all the advantages of the needle bearing are utilized to best advantage for transmission bearings and bearings for the cylinders in rolling mills.

When a split clamping cone is arranged only on one side, in the case of slip-in or flanged bearings, for example bearings on rolling mills and similar machines, it is advisable to arrange an annular flange opposite the annular groove, so that this annular flange in any case avoids the transmission of any supplementary pressure onto the supporting part of the hub when tightening the clamping cone. At the same time a certain rigidity is imparted to the supporting part, this being particularly important in the case of the shocks which occur in rolling mills and similar machines.

In the case of transmission bearings, these shock pressures do not occur, so that in this instance the radial fixing of the middle supporting part by means of clamping cones arranged on both sides is preferable.

The freedom from stressing and distortion is ensured by the annular groove and the stepped junction of the clamping cones on the supporting part.

The individual parts of the bearing, such as clamping nuts, pressure and supporting ring and so forth, interengage labyrinth-like, so that the bearing can be removed closed and dust-tight at any time as is often necessary, it being particularly noted that the clamping elements can be tightened and loosened from the outer side.

Two embodiments of the invention are illustrated by way of example in the accompanying drawing in which:—

Figure 1:
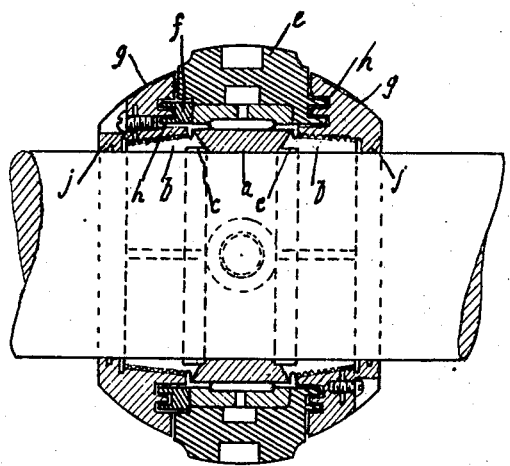
Fig. 1 shows an axial section of a transmission bearing.
Figure 2:
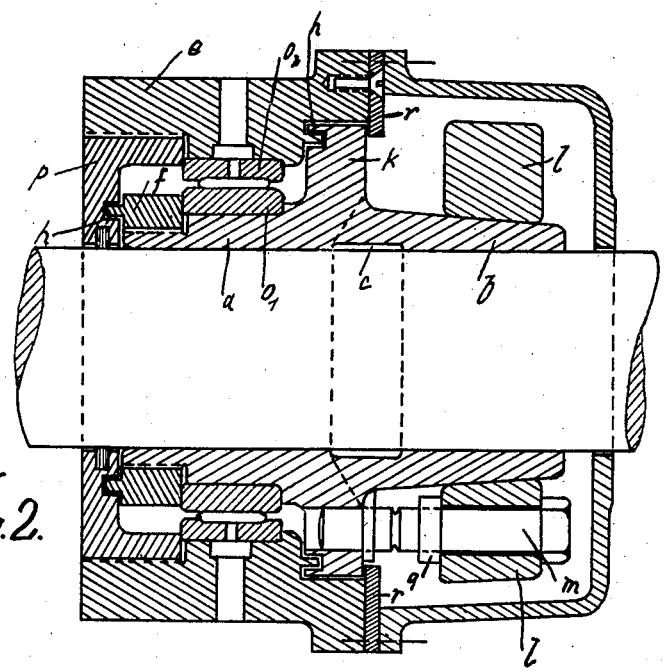
Fig. 2 is an axial section through a slip-in or flanged bearing for rolling mills or similar machines.

The needle bearing according to the invention consists substantially of a supporting element $a$, on one or both sides of which split clamping cones $b$ are arranged according to the purpose of use. In the case of transmission bearings (Fig. 1), in which not very high pressures occur, the two-sided arrangement of the clamping cones $b$ is preferably chosen, which cones radially fix the bearing in a perfect manner. In order to prevent the bending moments, occurring during the clamping, being transmitted to the supporting element $a$, the supporting hub has at the points of junction of the clamping cones two annular grooves $c$ and the clamping cones are joint step-like to the supporting element. Thus, the supporting element $a$ is therefore held free from stresses and distortion. The supporting element $a$ itself may be hardened and serve as race for the needles $d$ without a special cage.

The outer bearing element $e$ is fixed by means of pressure rings $f$ and clamping rings $g$, these rings serving at the same time as guide rings for the bearing.

The clamping nuts $g$ are extended beyond the clamping cones $b$ in such a manner that the flaps $j$ engage over the clamping cones $b$. Thus, in the case of excessive tightening of the stuffing box, the lubricant will not escape through the slits of the clamping cones $b$.

Therefore, contrary to all known constructions, special guide bearings are omitted, which fact represents a considerable simplification of the bearing according to the invention from a manufacturing point of view. The pressure and clamping rings are moreover provided with labyrinth passages $h$ of different depths, so that at the same time an absolutely oil and dust-proof packing is ensured when fitting the bearing. The bearing element can be dispatched thus closed, which is extremely important in the case of transmission bearings owing to the danger of soiling.

As above mentioned, it is also possible to fix the bearing on both sides. The bearing, for example where the bearings must be flanged on or slipped-in as in rolling mills and other machines, must be provided with only one clamping cone $b$, and an annular flange $k$ is arranged opposite the annular groove $c$, which flange forms a unit with the supporting element $a$ and the clamping cone $b$. This annular flange serves for imparting greater strength to the supporting hub and to enable the tightening of the clamping ring $l$ by means of screws $m$. It is evident that for the clamping ring $m$ a clamping nut may be substituted. Between the supporting ring $e$ and the supporting element $a$ a needle bearing is mounted, the inner ring $o_1$ of which, in the case of the expansion and also of the guide bearing, is fixed axially against the shoulders of the bearing supporting ring $e$ and against the cylindrical supporting element $a$ by the small pressure ring $f$ and its outer ring $o_2$ by the large pressure ring $p$. The screws $m$ have each a collar $g$ which automatically opens the clamping ring $l$ when the screws $m$ are unscrewed. A catch disc $r$ is arranged on the supporting ring $e$ so that the entire bearing can be removed with the machine frame after the clamping hub and the screw connection have been loosened. Further the annular flange, the supporting and pressure rings in this instance also interengage in labyrinth fashion so that an absolutely closed oil and dust-proof bearing element is produced.

The essential advantages of the invention are based on the facts that the supporting element $a$ of the hub is held absolutely free from stressing and distortion by means of the annular grooves and so forth, and that the clamping and supporting elements are at the same time packing elements so that the very advantageous needle bearing can be employed for new purposes in the construction of transmissions, rolling mills and so forth.

Further, by the employment of needles, the dimensions of the bearings can be made smaller, this being particularly important in the building of rolling mills and where in the case of pairs of bearings compactness is necessary, as only limited space is available for the bearings. Moreover, owing to the construction, a simplification of the manufacture is ensured and such needle bearings may be regarded as universal bearings, especially because any known bearing can be replaced by a needle bearing according to the invention. A particular advantage consists in the fact that the bearing can be fitted and removed in closed condition and can therefore be also dispatched in closed condition. Consequently, the delicate needles are no longer liable to become soiled as heretofore.

I claim:—

1. In a closed removable needle bearing a supporting hub, comprising a rigid supporting ring and a resilient cone at least on one side of said supporting ring having an annular recess in its inner surface directly adjacent said supporting ring.

2. A supporting hub for removable needle bearings as specified in claim 1 in which a resilient cone extends from each side of the rigid supporting ring, two annular recesses being provided one in the inner surface of each of said cones directly adjacent the supporting ring.

3. A supporting hub for removable needle bearings, as specified in claim 1, in which a cone extends from one side of the rigid supporting ring and has in its inner surface an annular groove directly adjacent the supporting ring, said ring having on its outer surface a flange approximately opposite the annular groove.

4. A supporting hub for removable needle bearings as specified in claim 1, in which the outer surface of the rigid supporting ring is hardened and serves directly as running surface for the needles without cage.

GEORG EISGRUBER.